R. P. CALVERT AND O. L. THOMAS.
PRODUCTION OF METHYL BORATE AND BORIC ACID FROM CRUDE SODIUM NITRATE.
APPLICATION FILED NOV. 5, 1917.
1,308,576.
Patented July 1, 1919.
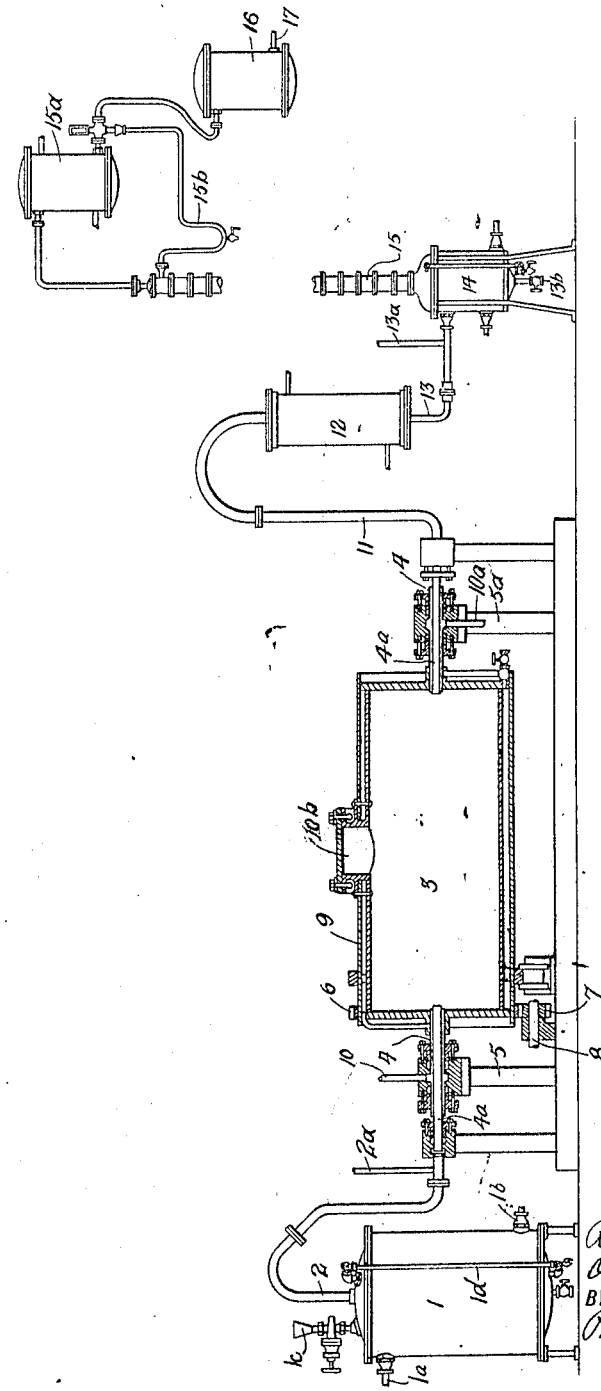

UNITED STATES PATENT OFFICE.

ROBERT P. CALVERT AND OTHO L. THOMAS, OF WILMINGTON, DELAWARE, ASSIGNORS TO E. I. DU PONT DE NEMOURS AND COMPANY, OF WILMINGTON, DELAWARE, A CORPORATION OF DELAWARE.

PRODUCTION OF METHYL BORATE AND BORIC ACID FROM CRUDE SODIUM NITRATE.

1,308,576.   Specification of Letters Patent.   Patented July 1, 1919.

Application filed November 5, 1917. Serial No. 200,438.

*To all whom it may concern:*

Be it known that we, ROBERT P. CALVERT and OTHO L. THOMAS, of Wilmington, in the county of New Castle, and in the State of Delaware, have invented a certain new and useful Improvement in Production of Methyl Borate and Boric Acid From Crude Sodium Nitrate; and do hereby declare that the following is a full, clear, and exact description thereof.

Our invention relates particularly to a process for treating crude sodium nitrate, as for example Chili saltpeter, and especially the product obtained in the Chili saltpeter industry, which contains a high percentage of potassium nitrate, to obtain an alkyl borate, such as methyl borate and boric acid therefrom.

The object of our invention is to provide a process by means of which methyl borate and boric acid may be produced from crude sodium nitrate, and particularly the product of the Chili saltpeter industry, which contains a high percentage of potassium nitrate,—that is to say, from 20% to 50% of potassium nitrate,—and which contains, furthermore, from 3% to 7% of boric acid, as well as other impurities, such as sodium chlorid, calcium sulfate, sand, potassium perchlorate and water.

The object of our invention is, furthermore, to remove the boric acid, so as to render the residual materials suitable for uses to which the product could not otherwise be applied, as for example, the production of refined saltpeter and refined sodium nitrate.

Further objects of our invention will appear from the detailed description thereof contained hereinafter.

While our invention is capable of being carried out in many different ways, we shall describe herein only certain ways of carrying out the same, and, while it is capable of being used in connection with many different types of apparatus, we shall describe only one type of apparatus for use in connection therewith and in the accompanying drawings, in which—

The figure is a diagrammatic representation of an apparatus which may be used in connection with our invention.

In the drawings we have shown a jacketed still 1, having a steam inlet $1^a$ and a steam outlet $1^b$ for heating the still. The still is further provided with a valved filling pipe $1^c$ for methyl alcohol and a gage glass $1^d$, a vapor outlet pipe 2, which has an inlet pipe $2^a$ for air or steam, said pipe 2 being arranged to deliver the vapor therefrom into a rotary drum 3, having hollow trunnions 4 and $4^a$, carried in suitable supports 5 and $5^a$. The drum 3 is adapted to be rotated by means of peripheral gears 6, meshing with a gear 7 on a shaft 8, passing through the supports 5, and adapted to be driven from any suitable source of power. The drum 3 has a heating jacket 9, adapted to be supplied with steam through the hollow trunnion 4, which connects with a steam supply pipe 10, while the condensed steam is carried off through a pipe $10^a$. A manhole $10^b$ in the drum 3 permits the entry and exit of the solid materials for the same. The vapors from the drum 3 pass out through a pipe 11, which is connected to a condenser 12, having an outlet pipe 13, leading to a fractionating still 14. The still 14 has a water inlet pipe $13^a$, connected to the pipe 13, a draw-off pipe $13^b$, and a vapor outlet pipe 15, leading to a primary condenser $15^a$ having a trap return pipe $15^b$ leading to the vapor outlet pipe 15, and thence to a condenser 16, from which the condensed materials are drawn off through an outlet pipe 17.

For example, our invention may be carried out as follows: A quantity of an alcohol, for example methyl alcohol is introduced into the still 1 and heat applied thereto in any suitable manner, while a quantity of saltpeter high in potassium nitrate, and having the composition above referred to, is introduced through the manhole $10^b$ into the rotary drum 3. For example, 40 parts of methyl alcohol and 100 parts of the saltpeter may be used for this purpose. This amount of methyl alcohol is more than sufficient to combine with the boric acid present. The temperature of the drum 3 is maintained at from 40° to 120° C., but usually at about 70° C., for a period of several minutes, while the drum is being rotated. Thereafter the volatile compounds in the drum 3 are distilled out of the said drum, so that they pass off through pipe 11 to the condenser 12. In this manner, the alcohol vapor or condensed alcohol in the drum 3 is brought into contact with the mixed nitrates and boric acid and combines with the latter or mixes with it in part, thus producing a vapor which carries off the boric acid. The vapor comprises methyl alcohol, containing boric acid and methyl borate. The distillate collects in the still 14. If desired the removal of the volatile materials from the drum 3 may be assisted by the injection of a current of air or steam by means of the pipe 2ª. Into the distillate in the still 14, 8 parts of water are then introduced through the pipe 13ª. As a result, the methyl borate is hydrolyzed to produce methyl alcohol and boric acid. Heat being applied to the still 14, the methyl alcohol and small amounts of unchanged methyl borate pass into the condenser 16 and are drawn off by the pipe 17. The boric acid remains dissolved in the water in the still 14, and may be drawn off from the same by the pipe 13ᵇ and crystallized out therefrom by cooling the solution. The mixed nitrates which have thus been purified by the removal of the boric acid therefrom may be separated in any suitable manner to produce pure potassium nitrate and pure sodium nitrate in any suitable manner; for example, in accordance with the processes set forth in the applications of Robert P. Calvert, on process of separating nitrates of potassium and sodium, Serial Number 183,821, filed August 1, 1917, and Andrew S. Yount, on method of separating nitrates of potassium and sodium, Serial Number 183,871, filed August 1, 1917.

Instead, however, the liquid may be treated by adding thereto a quantity of potassium chlorid, while the filtrate is still hot, sufficient to convert the materials in solution to saltpeter and sodium chlorid; as for example, 70 parts of potassium chlorid. The sodium chlorid and saltpeter may be then separated by crystallization.

While we have described our invention above in detail, we wish it to be understood that many changes may be made therein without departing from the spirit of our invention.

We claim:

1. The process which comprises separating boric acid from mixtures containing the same by adding a lower monohydric alcohol thereto and volatilizing the compound formed by the alcohol and the boric acid.

2. The process which comprises separating boric acid from mixtures of nitrates containing the same by adding a lower monohydric alcohol thereto and volatilizing the compound formed by the alcohol and the boric acid.

3. The process which comprises separating boric acid from mixtures containing the same by adding methyl alcohol thereto and volatilizing the compound formed by the alcohol and the boric acid.

4. The process which comprises separating boric acid from mixtures of nitrates containing the same by adding methyl alcohol thereto and volatilizing the compound formed by the alcohol and the boric acid.

5. The process which comprises separating boric acid from mixtures containing the same by adding an alcohol thereto, volatilizing the compound formed by the alcohol and the boric acid, condensing the vapors thus produced, and hydrolyzing the distillate.

6. The process which comprises separating boric acid from mixtures of nitrates containing the same by adding a lower monohydric alcohol thereto, volatilizing the compound formed by the alcohol and the boric acid, condensing the vapors thus produced, and hydrolyzing the distillate.

7. The process which comprises separating boric acid from mixtures containing the same by adding methyl alcohol thereto, volatilizing the compound formed by the alcohol and the boric acid, condensing the vapors thus produced, and hydrolyzing the distillate.

8. The process which comprises separating boric acid from mixtures of nitrates containing the same by adding methyl alcohol thereto, volatilizing the compound formed by the alcohol and the boric acid, condensing the vapors thus produced, and hydrolyzing the distillate.

9. The process which comprises separating boric acid from mixtures containing the same by adding a lower monohydric alcohol thereto, volatilizing the compound formed by the alcohol and the boric acid, condensing the vapors thus produced, hydrolyzing the distillate, and distilling off the alcohol.

10. The process which comprises separating boric acid from mixtures of nitrates containing the same by adding a lower monohydric alcohol thereto, volatilizing the compound formed by the alcohol and the boric acid, condensing the vapors thus produced, hydrolyzing the distillate, and distilling off the alcohol.

11. The process which comprises separating boric acid from mixtures containing the same by adding methyl alcohol thereto, volatilizing the compound formed by the alcohol and the boric acid, condensing the vapors thus produced, hydrolyzing the distillate, and distilling off the alcohol.

12. The process which comprises separating boric acid from mixtures of nitrates containing the same by adding methyl alcohol thereto, volatilizing the compound formed by the alcohol and the boric acid, condensing the vapors thus produced, hydrolyzing the distillate, and distilling off the alcohol.

13. The process which comprises separating boric acid from mixtures containing the same by adding a lower monohydric alcohol thereto, volatilizing the compound formed by the alcohol and the boric acid, condensing the vapors thus produced, hydrolyzing the distillate, distilling off the alcohol, and crystallizing out the boric acid from the residue.

14. The process which comprises separating boric acid from mixtures of nitrates containing the same by adding a lower monohydric alcohol thereto, volatilizing the compound formed by the alcohol and the boric acid, condensing the vapors thus produced, hydrolyzing the distillate, distilling off the alcohol, and crystallizing out the boric acid from the residue.

In testimony that we claim the foregoing we have hereunto set our hands.

ROBERT P. CALVERT.
OTHO L. THOMAS.

Witnesses:
G. D. HOPKINS,
S. L. ABRAMS.